United States Patent [19]
Korta et al.

[11] Patent Number: 5,748,303
[45] Date of Patent: May 5, 1998

[54] LIGHT SENSING DEVICE

[75] Inventors: Jean-Charles Korta, Mesa; Derek L. Davis; William J. Spaw, both of Phoenix, all of Ariz.; Lawrence T. Clark, Beaverton, Oreg.

[73] Assignee: Intel Corporation, Santa Clara, Calif.

[21] Appl. No.: 775,833

[22] Filed: Dec. 31, 1996

[51] Int. Cl.⁶ .................................................. G01J 1/10
[52] U.S. Cl. ...................... 356/229; 356/222; 250/214 R; 324/76.15; 324/76.38
[58] Field of Search .................................. 356/213, 218, 356/221, 229, 230; 250/214 R, 214.1, 214 C; 324/76.24, 76.38, 76.15

[56] References Cited

U.S. PATENT DOCUMENTS 4,728,188  3/1988  Kitagawa et al. ....................... 356/128
5,264,914  11/1993  Oho et al. .............................. 356/350

*Primary Examiner*—Hoa Q. Pham
*Attorney, Agent, or Firm*—Blakely, Sokoloff, Taylor & Zafman

[57] ABSTRACT

A light sensing device including at least one light sensor is provided. The at least one light sensor is configured to be exposed to a light image. In response to the light image, the at least one light sensor is configured to generate a first signal. The light sensing device further includes a measuring device coupled to the at least one light sensor. The light sensing device also includes a sampling generator configured to generate a sampling signal to the measuring device. The sampling signal is inhibited when the first signal is lesser than or equal to a predetermined value. Upon inhibition of the sampling signal, the measuring device retains a measure of the first signal.

17 Claims, 6 Drawing Sheets

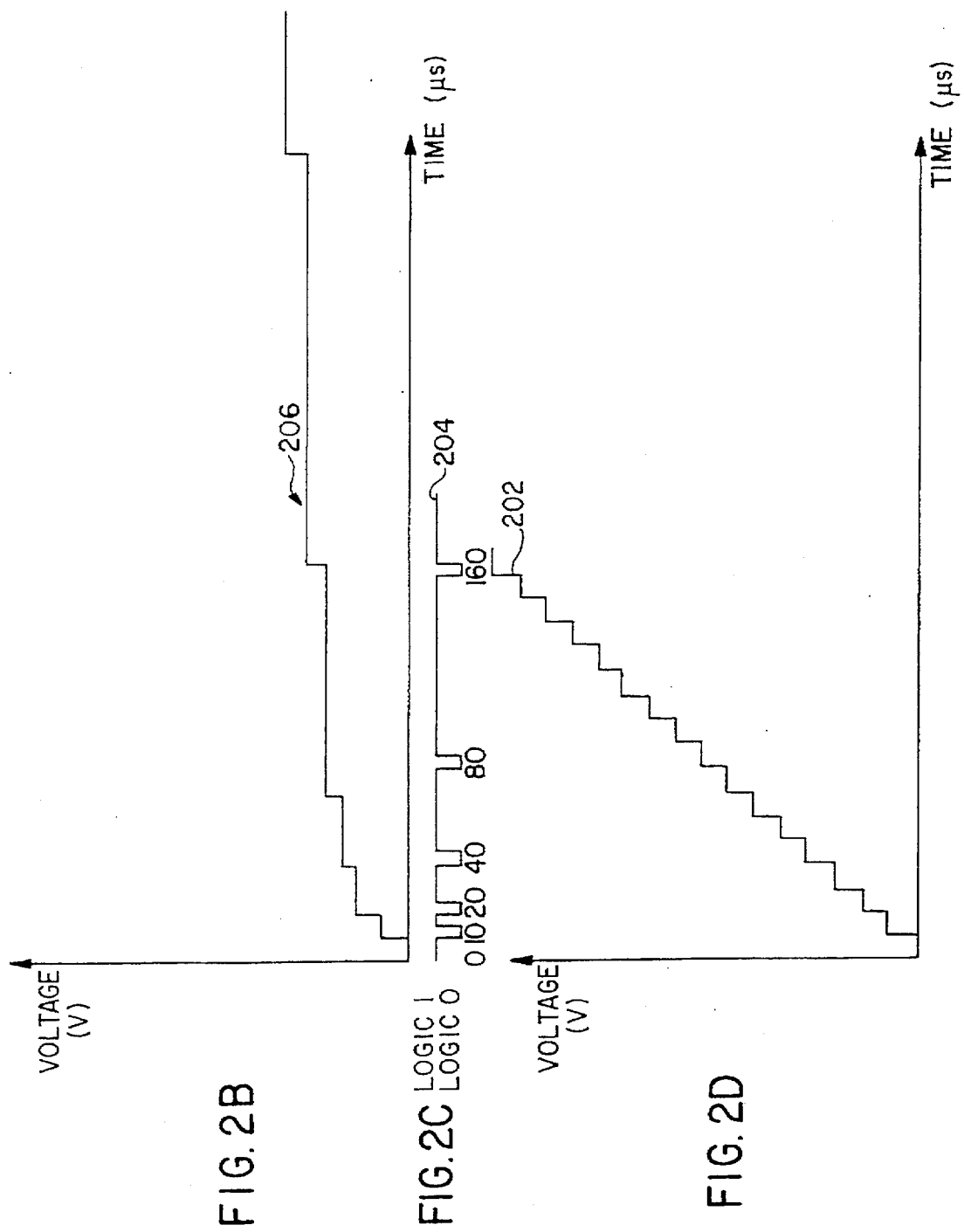

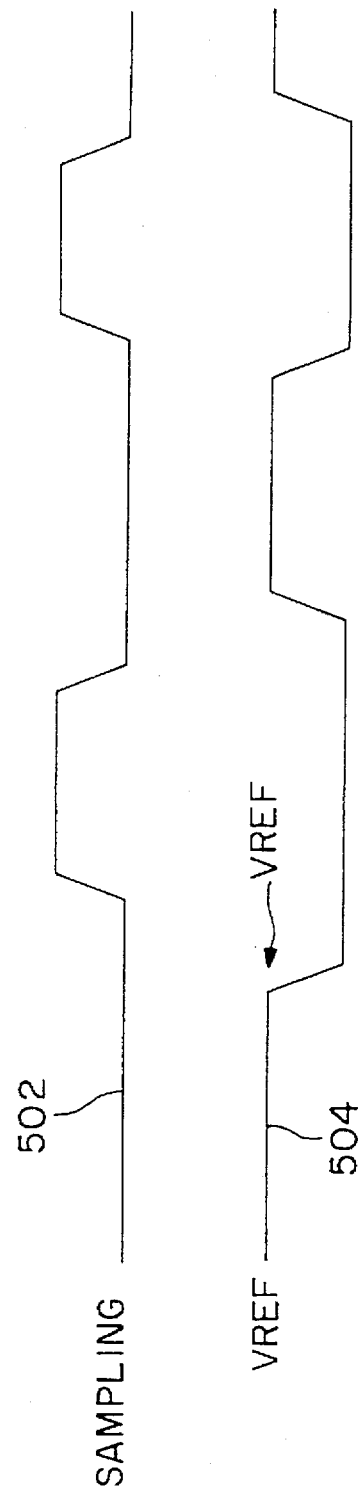

LIGHT SENSING DEVICE

BACKGROUND OF THE INVENTION

1. Field of the Invention

The present invention relates to the field of light detection. More specifically, the present invention relates to light sensing devices.

2. Description of the Related Art

Conventional electro-optical light sensing devices typically include one or more photoreceptors, such as photodiodes, photogates, phototransistors, et al., each representing one pixel of an array or row of such photoreceptors. These photoreceptors respond to light stimuli impinging thereon, according to the photoelectric effect. The basic photoelectric effect in most electro-optical imaging devices is linear, i.e., a charge collected by a photoreceptor is proportional to a number of photons impinging thereon. A photoreceptor may, thus, convert a light image incident thereon into an electrical charge.

Light sensing devices typically include, for each photoreceptor, an integrating device such as a capacitor that stores electrons generated by the photoreceptor in response to the light image incident thereon. The total electrical charge that the capacitor stores at a given moment can be translated into a voltage according to the well-known formula $V=Q/C=nq/C$ where C is the capacitance of the capacitor, V is the voltage across the capacitor, Q is the total charge stored by the capacitor, q is the charge of an electron and n is the number of electrons generated. In certain conventional light sensing devices, the capacitor is initially precharged to a known value and then discharged by a photoreceptor's constant current, which is proportional to the intensity of the light incident thereon. After a predetermined integration time—which is the same for all photoreceptors in the array during a given exposure—the voltage across the capacitor drops by a value that is proportional to the intensity of the light impinging onto the respective photoreceptor.

If the integration time during which a photoreceptor is exposed to light is too long, the capacitor associated with that photoreceptor (hereinafter referred to as "integrating capacitor") may saturate. In this case, further integration may cause inaccurate measuring of the light's intensity. This poses a serious problem in the case of an array of photoreceptors receiving a light image that has vastly different levels of brightness across the array. If the integration time is too long, some integrating capacitors associated with photoreceptors exposed to brighter light may saturate, such that these photoreceptors, at aggregate level, may not accurately convey differences in the intensities of light at which each of these photoreceptors are exposed.

One way to correct this problem is to adjust the integration time according to the time it takes the integrating capacitor, associated with the brightest pixels in the image, to saturate. In this way, when one integrating capacitor in the array is close to saturation, all the integrating capacitors in the array cease integrating. However, shortening the integration time according to the brightest pixels in the array may cause the undesirable effect of decreasing the dynamic range of the photosensor. This is so, as the integrating capacitors receiving less bright portions of an image may accumulate less charge within the adjusted shorter integration time, thereby causing a smaller voltage drop thereon. Since a sensing device typically has a fixed sensitivity, a smaller drop in voltage may result in reduced dynamic range of the sensing device. For example, for two photoreceptors receiving thereon portions of an image that are darker, but different in degree of luminosity, a shorter integration time might cause the integrating capacitors to be charged to voltage levels that are very close to each other. In this case, an off-the-shelf analog-to-digital (A/D) converter may not distinguish enough, or at all, the difference in the intensity of the light impinging on these photoreceptors to faithfully detect and eventually reproduce the impinging light image. This is not acceptable for accurate light sensing devices that need to operate within a very wide dynamic range of surrounding light intensities which may easily span over several orders of magnitude between full sun outdoors and low intensity indoors. In this case, a more sophisticated high resolution analog-to-digital converter may be necessary. However, such a device is more expensive and possibly slower.

Accordingly, it is desirable to provide a light sensing device with a wide dynamic range and with a mechanism that, without affecting the dynamic range of the light sensing device, prevents individual photoreceptors from saturating. It is also desirable to provide a light sensing device that provides photoreceptors, which are exposed to light of lower intensity, a sufficient time to integrate a signal related to the light's intensity, such that the light sensing device is sensitive to small variations in the light's intensity in the vicinity of darker areas of an image.

BRIEF SUMMARY OF THE INVENTION

The present invention provides a light sensing device including at least one light sensor. The at least one light sensor is configured to be exposed to a light image. In response to the light image, the at least one light sensor is configured to generate a first signal. The light sensing device further includes a measuring device coupled to the at least one light sensor. The light sensing device also includes a sampling generator configured to generate a sampling signal to the measuring device. The sampling signal is inhibited when the first signal is lesser than or equal to a predetermined value. Upon inhibition of the sampling signal, the measuring device retains a measure of the first signal.

In one embodiment according to the present invention, the light image has an intensity that may be represented by a floating point number. The floating point number includes a mantissa part and an exponent part. Also, the measuring device includes first and second measuring devices. The first measuring device is configured to measure the mantissa of the floating point number and the second measuring device is configured to measure the exponent of the floating point number. The light measuring device further includes a sampling generator configured to generate a sampling signal to the first and second measuring devices. The sampling signal is inhibited when the first signal (that provides a measure of the mantissa) is lesser than or equal to a predetermined value. When the sampling signal is inhibited, the first and second measuring devices retain the measure of the light's intensity in floating point representation. This floating point representation is capable of representing a much wider dynamic range than a linear representation, as used in present devices, using the same number of bits per pixel.

BRIEF DESCRIPTION OF THE DRAWINGS

The features, aspects, and advantages of the present invention will become more fully apparent from the following Detailed Description, appended claims, and accompanying drawings in which:

FIGS. 2a, 2b, 2c and 2d illustrate graphic representations of various waveform signals in connection to the light sensing device according to the present invention;

FIG. 5 shows various waveforms related to the comparator circuit according to the present invention.

DETAILED DESCRIPTION OF THE INVENTION

In the following description, numerous specific details are set forth to provide a thorough understanding of the present invention. However, one having ordinary skill in the art should be able to practice the invention without specific details. In some instances, well-known circuits, structures and techniques have not been shown in detail to not unnecessarily obscure the present invention.

Figure 1:
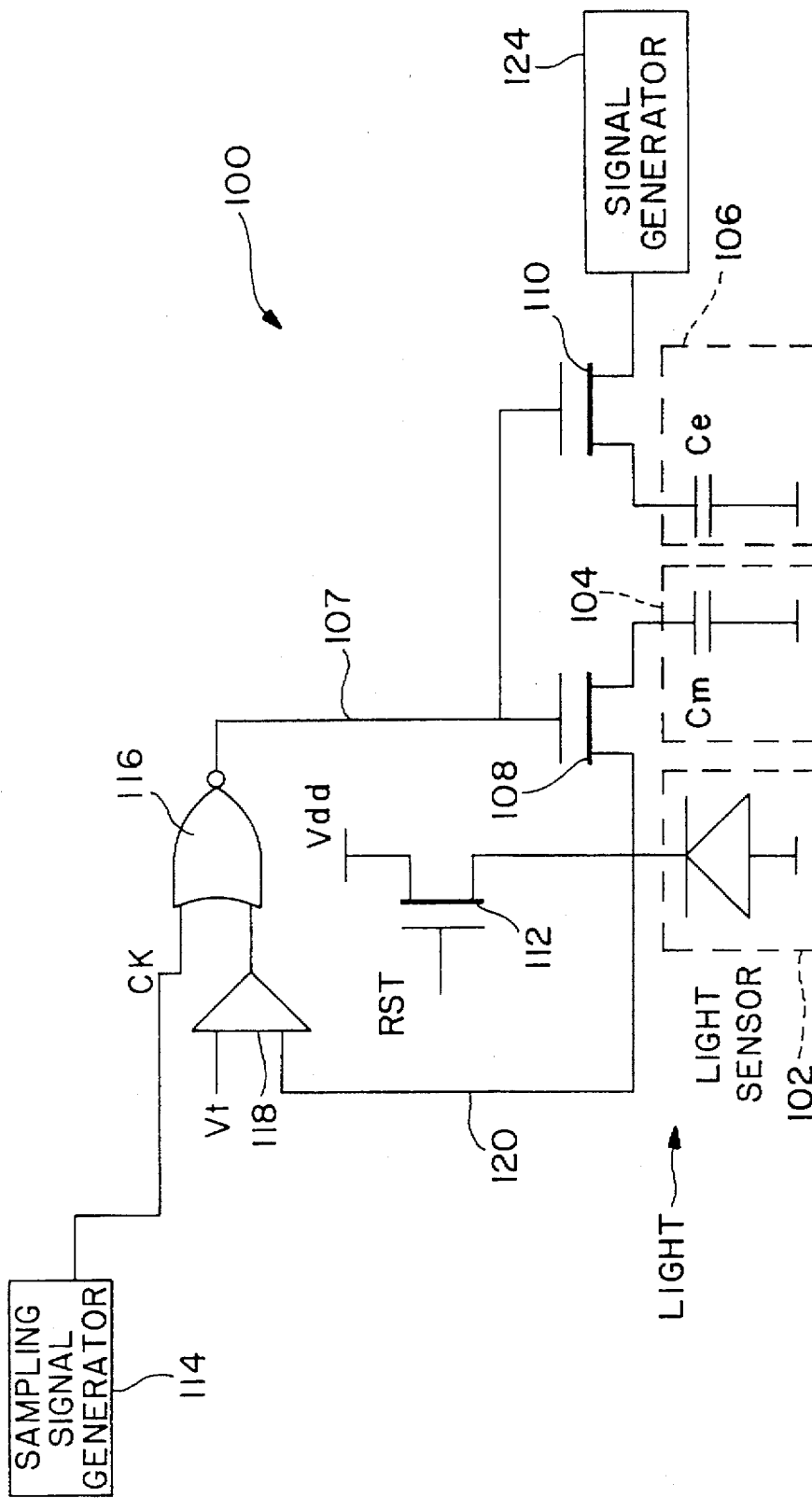
FIG. 1 illustrates a light sensing device according to the present invention.

FIG. 1 illustrates a light sensing device 100 according to the present invention. Light sensing device 100 may be utilized alone or in connection with an array that includes a plurality of such light sensing devices. In the following discussion, light sensing device 100 is described, taking into account that it may be used in conjunction with other such light sensing devices in an array of light sensing devices.

Light sensing device 100 includes a light sensor 102 that may be an opto-electronic photoreceptor such as a photodiode, photogate, or phototransistor. Such photoreceptors function in accordance to the well-known photoelectric effect and are well-known by persons having ordinary skill in the art. Light sensor 102 generates a first signal in response to an incident light image impinging thereon. In one embodiment, the first signal may be a substantially constant electrical current proportional to a mantissa of a floating point number representing an intensity of the incident light projected onto the photoreceptor. As it is well-known a floating point number includes a mantissa part and an exponent part.

The light sensing device 100 includes, for each light sensor 102, a measuring device 105 (shown in dotted line). The measuring device 105 includes a first measuring device (Cm) 104 that provides a measure of the mantissa of the floating point number and a second measuring device (Ce) 106 that provides a measure of the exponent of the floating point number. The first measuring device (Cm) 104 and the second measuring device (Ce) 106 are coupled via switch devices 108 and 110 to line 107 to receive a sampling signal. The first measuring device (Cm) 104, controlled by the sampling signal, is configured to sample (measure) the first signal, thereby producing a measure of the mantissa part. The second measuring device (Ce) 106, controlled by the sampling signal, is configured to sample a second signal generated by a signal generator 124, thereby producing a measure of the exponent part. In the embodiment of the present invention described herein, the first and second measuring devices (Cm) 104 and (Ce) 106 respectively are implemented as capacitors but the present invention is not limited in this respect to these devices.

Typically, at the outset, first measuring device (Cm) 104 is charged to a voltage $V_{DD}$ via a first switch device 112 when a RESET (RST) signal is asserted to the first switch device 112. In the embodiment according to the present invention described herein, first switch device 112 may be an electronic switch, such as an NMOS transistor that has a gate coupled to the RST signal, but the present invention is not limited in this respect to a transistor. A drain of first switch device 112 may be coupled to a voltage supply $V_{DD}$ and a source thereof may be coupled to a cathode of light sensor 102. First switch device 112, when ON, pulls the cathode of light sensor 102 to $V_{DD}$.

Initially, upon reset, light sensor 102 is reversed biased to voltage $V_{DD}$, while first measuring device (Cm) 104 is precharged to $V_{DD}$. In the absence of dark current (thermally induced current), light sensor 102 may stay in the same state for a very long time. However, due to the incident light impinging thereon, light sensor 102 emits electrons, thereby causing first measuring device (Cm) 104 to discharge therethrough. When the intensity of the light incident on light sensor 102 is constant, a constant current is generated through light sensor 102.

Light sensing device 100 further includes second switch device 108 coupled to light sensor 102 and to first measuring device (Cm) 104. In one embodiment in accordance to the present invention, second switch device 108 may be an NMOS transistor that has a gate thereof coupled to a sampling signal driven via line 107, and a source thereof coupled to first measuring device (Cm) 104. Additionally, a third switch device 110 is coupled to second measuring device (Ce) 106 and to signal generator 124. The third switch device 110 may be an NMOS transistor with a drain thereof coupled to signal generator 124, a source thereof coupled to second measuring device (Ce) 106, and a gate thereof coupled to the sampling signal. When second switch device 108 is ON and the RST signal is asserted to first switch device 112, first measuring device (Cm) 104 is charged to a voltage approximately equal to $V_{DD}$. When the third switch device 110 is on, second measuring device (Ce) 106 may be reset by the signal generator 124 by short-circuiting the drain of third switch device 110 to ground.

Sampling signal generator 114 generates sampling signal CK that is coupled via NOR gate 116 to the gates of second switch device 108 and third switch device 110. In this embodiment, CK is asserted when sampling signal generator 114 generates a 0 logic signal to a first input of NOR gate 116. Assuming that a second input of NOR gate 116 is set to 0 logic, second switch device 108 and third switch device 110 are turned ON when sampling signal CK is asserted.

While conventional electronic light sensing devices solely utilize a single capacitor, i.e., first measuring device (Cm) 104, the present invention provides an additional capacitor, i.e. second measuring device (Ce) 106. This capacitor is intelligently charged by signal generator 124 in conjunction with sampling signal generator 114. As it will be explained later in this section, these two devices cause second measuring device (Ce) 106 to be charged over time to a voltage that represents a measure of an exponent part of the floating point number representing the value of the intensity of the light impinging on light sensor 102. Light sensing device 100, with structures configured to provide the mantissa and the exponent part of the floating point number, offers a more accurate mechanism for detecting and measuring light over a wide dynamic range without the need to utilize a more expensive highly accurate A/D converter.

The present invention further provides a comparator circuit 118 coupled to a cathode of light sensor 102 via line 120. The comparator circuit 118 receives at a first input thereof the first signal, which in this particular embodiment is the voltage on light sensor 102 at a given time. Once the voltage on light sensor 102 decreases to a predetermined voltage $V_T$, comparator circuit 118 generates at an output thereof a signal set to logic 1. The voltage value $V_T$ is chosen to be a little greater than the threshold voltage of light sensor 102 to avoid saturation of this light sensor. This value of $V_T$ can be anywhere between 5% to 15% of the full range.

The logic 1 signal generated at the output of comparator circuit 118 is inverted by NOR gate 116 thereby producing a logic 0 signal to the gates of second switch device 108 and third switch device 110. Consequently, second switch device 108 and third switch device 110 are turned off as the voltage at the gates thereof is set to a logic 0. As a result, light sensor 102 is prevented from further discharging first measuring device (Cm) 104 while the signal generator is prevented from further charging second measuring device (Ce) 106. At this point, the voltages on first measuring device (Cm) 104 and second measuring device (Ce) 106 provide a measure of the mantissa and exponent respectively, of the floating point number proportional to the intensity of the light impinging on light sensor 102. In this way, the comparator circuit 118 inhibits the sampling signal CK, generated by sampling signal generator 114, when the voltage at the cathode of light sensor 102 has a value that is equal to or lower than $V_T$.

Additionally, in the case of an array including a plurality of light sensors 102, each light sensor has its own comparator circuit 118. In this way, a light sensor 102 may continue discharging first measuring device (Cm) 104, associated therewith, to a value approximately equal to $V_T$, without being inhibited by other light sensors that may have reached $V_T$ earlier, and thus may have been inhibited by their own comparator circuits. The light sensing device 100 according to the present invention, thus, allows adjustment of the integration time on a localized basis, i.e. each light sensor 102 of a light sensing device, including a plurality of such light sensors, may adjust the integration time for its associated first measuring device (Cm) 104 and second measuring device (Ce) 106 independently of other light sensors.

FIGS. 2a, 2b, 2c and 2d illustrate graphic representations of several signals generated in connection with the light sensing device 100 (illustrated in FIG. 1).

Figure 2A:
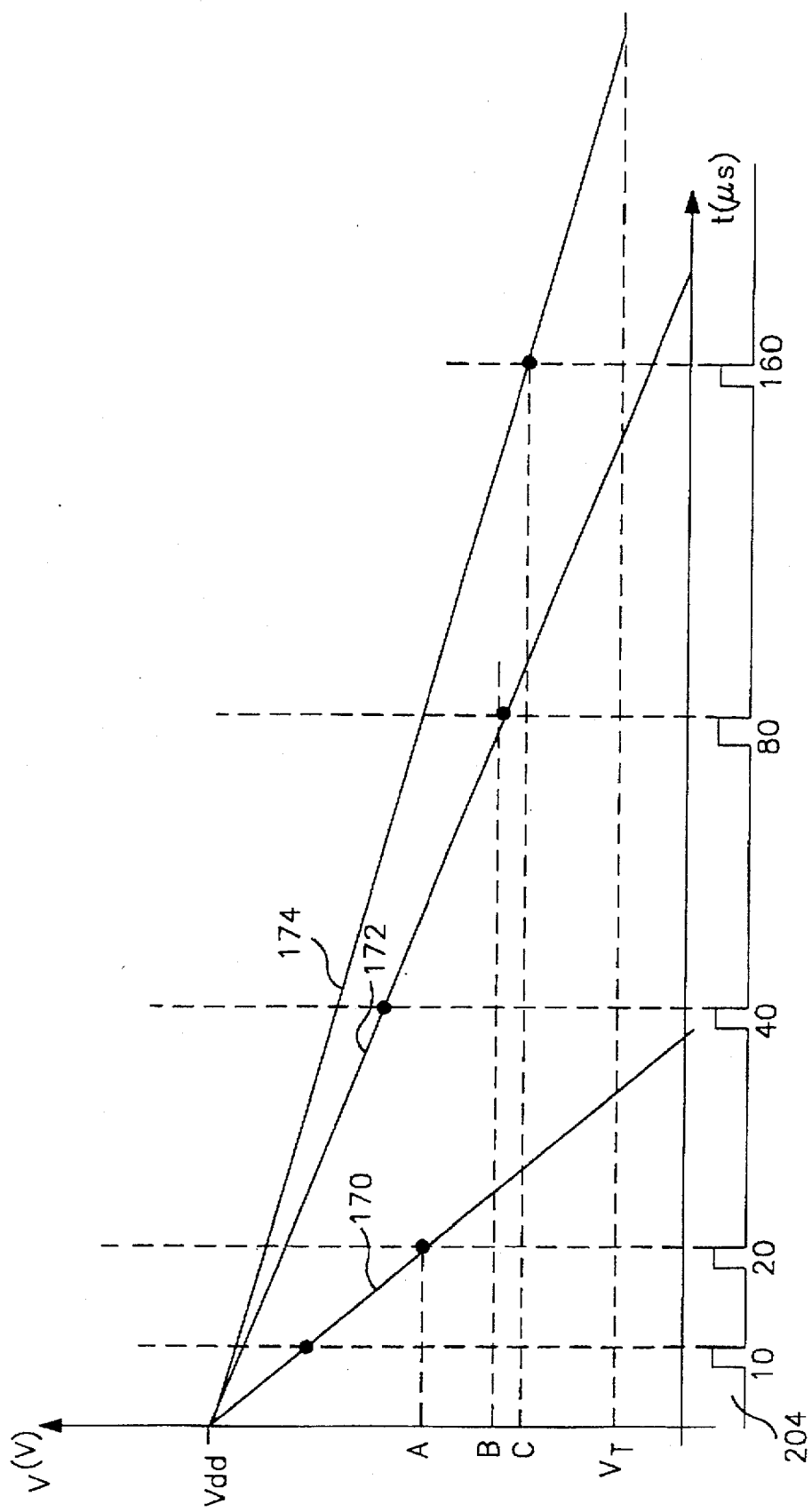

FIG. 2a illustrates a voltage time diagram in connection with an array of light sensors (of which light sensor 102 is shown in FIG. 1) exposed to light. Initially, all first measuring devices (Cm) 104 associated with light sensors 102 of the array are precharged to a voltage value substantially equal to $V_{DD}$. In this figure three light sensors voltage waveforms (170, 172 and 174) are shown. Waveform 170 corresponds to a light sensor that is exposed to a light having a higher intensity than the light to which light sensors 2 and 3 having the voltage waveforms 172 and 174 respectively are exposed. The light sensor represented by waveform 172 is exposed to light having higher intensity than the intensity of the light incident onto the light sensor represented by waveform 174.

Signal 204 represents a sampling signal that includes a plurality of pulses corresponding to the times when measuring devices 104 and 106 of FIG. 1 are sampled. FIG. 2a illustrates that the last voltage value sampled onto first measuring device (Cm) 104 of light sensor 1 corresponds to the time 20 microseconds, which is the time at which the light sensor 1 is last sampled by the sampling signal. Note that light sensor 1 reaches the voltage $V_T$ at a time later than 20 microseconds but earlier than 40 microseconds which is the time at which a next sampling would occur. The voltage value retained by second measuring device (Ce) 106 of light sensor 1 is therefore proportional to the time at which the last sampling of light sensor 1 occurred (20 microseconds).

With respect to light sensor 2, the last voltage value sampled on its associated first measuring device (Cm) 104 is B, while the value of the voltage stored on second measuring device (Ce) 106 is proportional to 80 microseconds which is the time at which the measuring devices 104 and 106, associated with light sensor 2, are last sampled before the waveform 172 decreases to the voltage $V_T$. With respect to light sensor 3, a voltage C on the first measuring device (Cm) 104 proportional to the mantissa corresponds to the time 160 microseconds at which light sensor 3 is last sampled before the voltage thereon decreases below $V_T$. While the difference in voltages sampled on the first measuring devices (Cm) 104 of adjacent light sensors becomes smaller for adjacent pixels that are exposed to light of lower intensity, the light sensing device 100 with its second measuring device (Ce) 106 provides an additional factor distinguishing between the intensity of different light sensors—the time at which the last sampling occurred. A voltage value proportional to this time, for each light sensor, is provided by the voltage stored on capacitor (Ce) 106. This voltage value may later by processed by a detecting device (s) to obtain a value of the time at which a respective light sensor was last sampled. This value of the time, in exponential form, then becomes part of the floating point number representing the intensity of the light impinging on the respective light sensor. The floating point representation provides a higher dynamic range of light sensing device 100 according to the present invention.

FIG. 2b diagrammatically illustrates a waveform 206 representing the exponent part of the above-mentioned floating point number. Waveform 206 has a "discrete" exponential shape that is generated by the combination of sampling signal 204 (illustrated in FIG. 2c) and signal 202 (illustrated in FIG. 2d) generated by signal generator 124. In one embodiment according to the present invention, signal generator 124 generates ramp signal 204 while sampling signal generator 114 generates signal 204 which is deactivated at exponentially increasing time intervals Signal 204, thus pulses from logic 1 to logic 0 at intervals that increase exponentially with time. In this way, first measuring device (Cm) 104 and second measuring device (Ce) 106 (shown in FIG. 1) are sampled at time intervals that increase exponentially with time. For example, first measuring device (Cm) 104 and second measuring device (Ce) 106 are first sampled 10 microseconds following the beginning of a new sampling cycle. A second sampling occurs 20 microseconds after the beginning of the first sampling, the third sampling occurs 40 microseconds after the beginning of the first sampling, the fourth sampling occurs 80 microseconds after the beginning of the first sampling, and so on. Once signal 204 is inhibited by comparator circuit 118 (of FIG. 1), the first measuring device (Cm) 104 retains a measure of the voltage on the light sensor when the last sampling occurred, while second measuring device (Ce) 106 retains a measure of a voltage proportional with the time the last sampling occurred. The voltage values of first measuring device (Cm) 104 and second measuring device (Ce) 106 may be read and converted into digital values by a detecting device (not shown), which may be one of the well-known detecting devices in the art.

By designing sampling signal generator 114 to generate the signal 204 shown in FIG. 2c, and signal generator 124 to generate signal 202 shown in FIG. 2b, second measuring device (Ce) 106 may be charged at discrete voltage levels represented by signal 206 that has a logarithmic alure.

Furthermore, the voltages at which first measuring device (Cm) 104 and second measuring device (Ce) 106 are charged depend, for each light sensor, on the intensity of the light impinging on the respective light sensor 102. In this way, the mantissa and the exponential part of the floating point number representing the intensity of the light impinging on a light sensor are determined on a localized basis.

Figure 3:
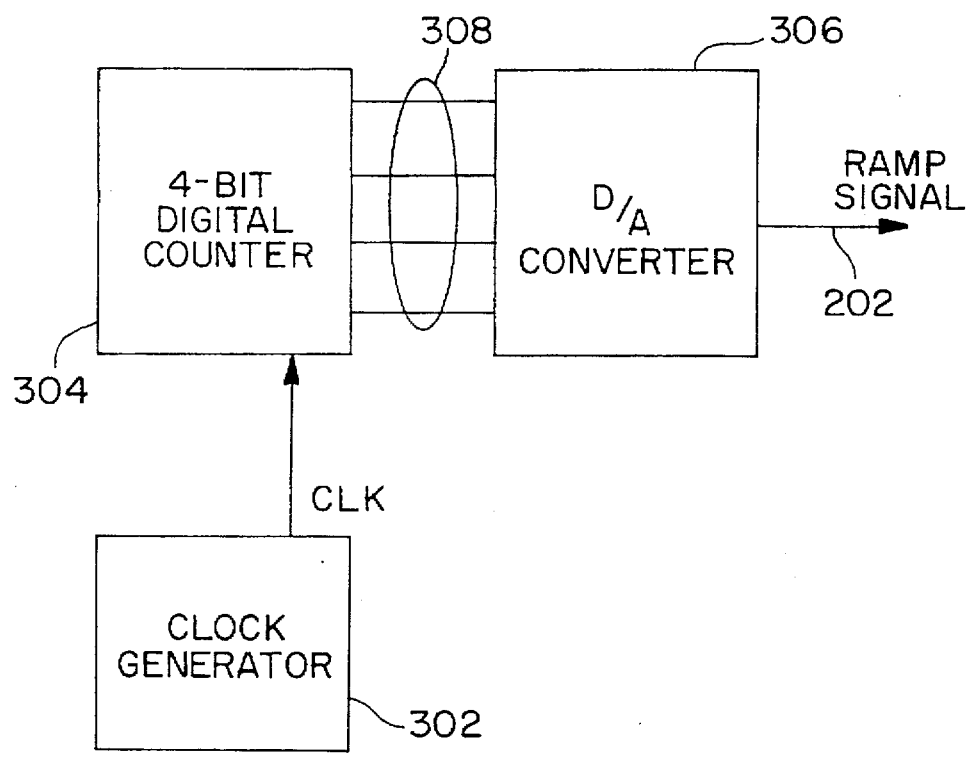
FIG. 3 diagrammatically illustrates an implementation of a Signal Generator according to the present invention.

FIG. 3 diagrammatically illustrates one embodiment of a signal generator 124 according to the present invention. A clock generator 302 generates a clock signal (CLK) at constant time intervals to a four-bit digital counter 304. Four-bit digital counter 304 is coupled via four lines 308 to a digital-to-analog (D/A) converter 306 which then generates ramp signal 202 shown in FIG. 2.

In another embodiment according to the present inventions, signal 206 of FIG. 2b may be generated by driving discrete signal 204 directly to the four-bit digital counter 304. In this case, the D/A converter 306 produces signal 206 (illustrated in FIG. 2) such that second measuring device (Ce) 106 (of FIG. 1) may not be necessary.

Figure 4:
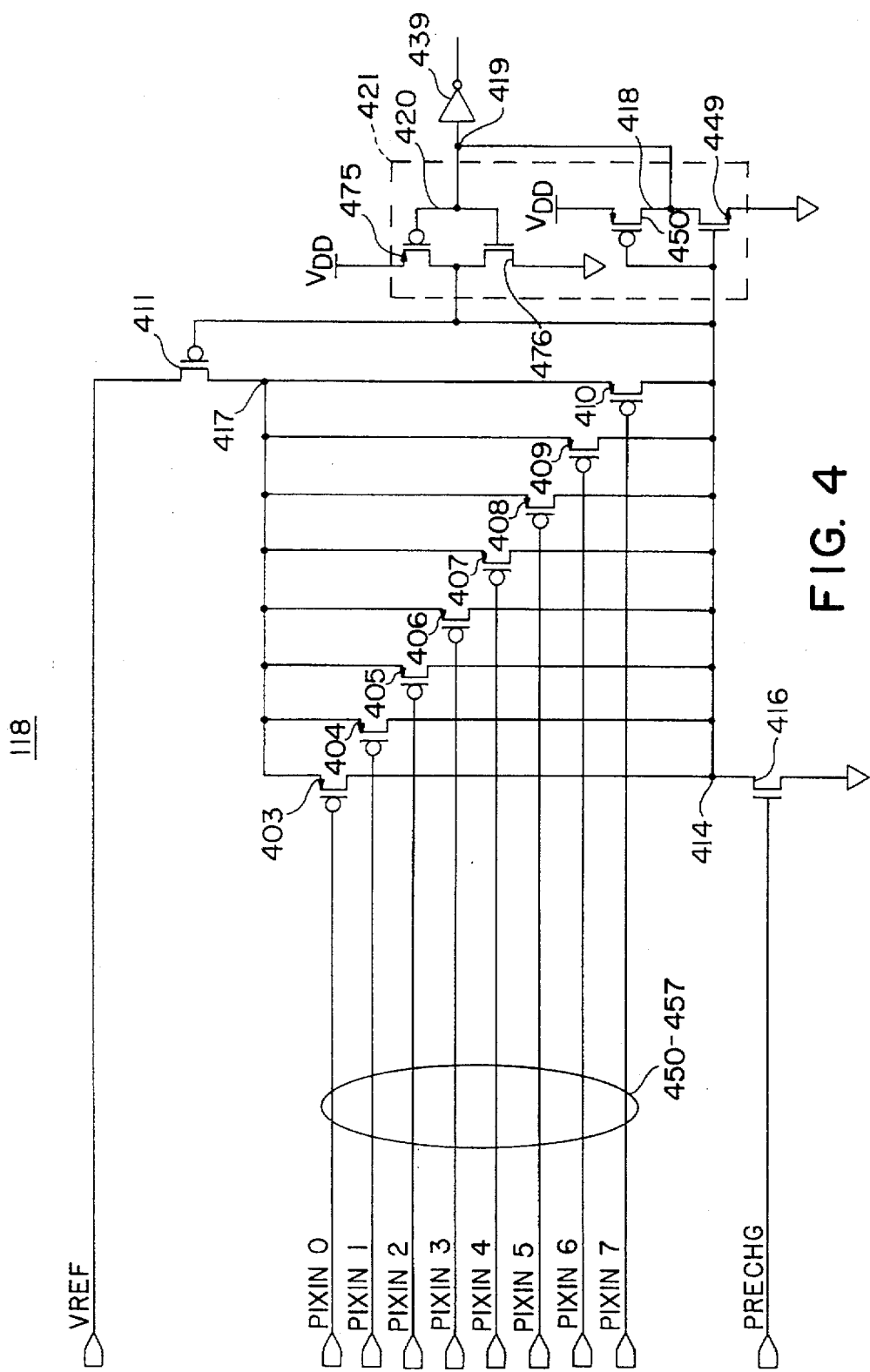
FIG. 4 illustrates a comparator circuit distributed among eight light sensing devices according to the present invention.

FIG. 4 illustrates a comparator circuit 118 according to the present invention. In this embodiment, a plurality of adjacent light sensors of the array are coupled to the comparator circuit 118 via input lines 450–457, each of these lines coinciding with one line 120 shown in FIG. 1. In FIG. 4, eight different light sensors, PIXIN0 to PIXIN7 of an array, are coupled to the input lines 450–457 of comparator circuit 118.

Comparator circuit 118 includes a plurality of devices 403–410 each coupled via one of the input lines 450–457 to a light sensor associated thereto, such as light sensor 102 of FIG. 1. In the embodiment illustrated in FIG. 4, the devices 403–410 are PMOS transistors that are each coupled at the gates thereof via one of input lines 450–457 to a cathode of one of light sensors 102 of the array. All devices 403–410 have a drain commonly coupled to node 414. Node 414 is coupled to a discharger circuit 416 that is implemented as an NMOS transistor in this embodiment, but the present invention is not limited to this implementation. Discharger circuit 416 pulls node 414 to ground when a PRECHG signal is asserted to a gate of this transistor. Typically, the PRECHG signal is asserted at the beginning of each sampling cycle. As long as none of light sensors 102 have discharged their corresponding first measuring device (Cm) 104 to a voltage equal to or lower than $V_T$, none of devices 403–410 conduct current. Devices 403–410 conduct current if the difference between the voltage at their gates and the voltage at their source is larger than a threshold voltage ($V_{TP}$), for these devices (PMOS transistors).

Comparator circuit 118 also includes a switch device 411 coupled to a reference signal VREF. In the embodiment discussed herein, switch device 411 includes a PMOS transistor, but the present invention is not limited to a PMOS transistor implementation of the switch device 411. Switch device 411 is coupled at a source thereof to a VREF signal, while a drain thereof is coupled to the sources of devices 403–410 via node 414. The gate of switch device 411 is coupled to the drains of devices 403–410. Typically, the voltage VREF is substantially equal to $V_T+V_{TP}$, where $V_T$ is the predetermined value below which the sampling signal is inhibited and $V_{TP}$ is the threshold voltage for PMOS transistors 403–410.

At the outset, discharger circuit 416 pulls node 414 to ground and switch device 411 is ON as the difference between the signal VREF and ground is larger than the threshold voltage $V_{TP}$ for switch device 411. When the voltage on one of the light sensors 102 is equal to or lower than $V_T$, the source-gate voltage difference for one of devices 403–410, coupled to that photodiode, exceeds $V_{TP}$, and therefore that respective transistor conducts current. If none of light sensors 102 discharged their associated first measuring devices (Cm) 104 to $V_T$ or a lower voltage, all devices 403–410 are in subthreshold, and therefore node 414 remains at 0 logic. The scheme illustrated in FIG. 4 where comparator circuit 118 is coupled to the eight light sensors PIXIN0–PIXIN7 provides most accurate results when the eight light sensors are positioned adjacent to each other, such that light variations across the eight adjacent light sensors are negligible. In this way, the embodiment illustrated in FIG. 4 is cost-effective because a comparator for each light sensor is not required.

Comparator circuit 118 further includes keeper circuit 421 (shown in dotted line) that includes a first inverter 418 and a second inverter 420. First inverter 418 pulls output node 419 of comparator circuit 118 to the upper rail $V_{DD}$ when node 414 is set to 0 logic. Second inverter 420 includes NMOS transistor 476 that keeps node 414 to ground once this node has been initially pulled to ground by discharger circuit 416. This scheme insures that the voltage at node 414 does not substantially change over time as a result of charge accumulating at this node due to leakage currents. Such accumulation of charge is undesirable, because it may cause changing of the switching point at which devices 403–410 start conducting.

Once one of the light sensors 102 discharges its first measuring device (Cm) 104 to voltage $V_T$ or lower, one of devices 403–410, corresponding to that light sensor, starts conducting thereby pulling node 414 to a voltage level (approximately $V_T+V_{TP}$) high enough to cause first inverter 418 to pull output node 419 to ground. The 0 logic signal at output node 419 is further passed through inverter 439 and then to NOR gate 116 of FIG. 1. The net result is that NOR gate 116 pulls the gates of second switch device 108 (FIG. 1) and third switch device 110 (FIG. 1) to ground, thereby switching these transistors off such that further discharge of first measuring device (Cm) 104 and charging of second measuring device (Ce) 106 of FIG. 1 is prevented.

Once node 414 is pulled to a voltage approximately equal to $V_T+V_{TP}$ and the first inverter 418 pulls output node 419 to ground, the second inverter 420, by means of PMOS transistor 475, pulls node 414 further up to $V_{DD}$ thereby completing the switching transition of node 414. This causes switch device 411 to be cut off as the difference between the voltage VREF at its source and the voltage $V_{DD}$ at its gate is greater than $V_{TP}$. This scheme prevents further consumption of power once one of devices 403–410 starts conducting. Note that when switch device 411 switches off, none of devices 403–410 conducts since the current path between VREF and node 414 is closed.

FIG. 5 shows a diagram of sampling signal 502 and of reference voltage VREF 504. When sampling signal 502 is high, in which case first measuring device (Cm) 104 is allowed to discharge, VREF is set to 0. In doing so, if one of light sensors 102 reaches the voltage $V_T$ when the eight light sensors, PIXIN0 to PIXIN7, are sampled, the comparator circuit 118 may not inhibit the sampling signal as long as this signal is asserted. Since VREF is 0, the difference in voltages between the gate and the sources of devices 403–410 is lower than $V_{TP}$. However, once the sampling signal is deasserted, VREF is set back to $V_T+V_{TP}$ and the comparator circuit 118 prevents further sampling if one of the light sensors 102 reaches the $V_T$ voltage.

In the foregoing specification, the invention has been described with reference to specific embodiments thereof. It will however be evident that various modifications and changes may be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

We claim:

1. A light sensing device comprising:

at least one light sensor configured to be exposed to a light image and responsive thereto to generate a first signal;

a measuring device coupled to said at least one light sensor;

a sampling generator configured to generate a sampling signal to said measuring device, said sampling signal being inhibited when said first signal is lesser than or equal to a predetermined value; and wherein upon inhibition of said sampling signal, said measuring device retaining a measure of said first signal.

2. The light sensing device of claim 1 further including a comparator circuit coupled to said at least one light sensor and to said measuring device, said comparator configured to inhibit said sampling signal when said first signal is lesser than or equal to a predetermined value.

3. The light sensing device of claim 2 wherein said comparator circuit is coupled to a reference signal that prevents said comparator circuit from inhibiting said sampling signal when said sampling signal is active.

4. The light sensing device of claim 2 wherein said comparator circuit is coupled to a predetermined number of adjacent pixels.

5. The light sensing device of claim 1 wherein said light image has an intensity represented by a floating point number that includes a mantissa part and an exponent part and said measuring device includes first and second measuring devices configured to retain a measure of said mantissa part and said exponent part respectively.

6. The light sensing device of claim 5 wherein said sampling signal pulses at discrete exponentially increasing intervals of time.

7. The light sensing device of claim 6 wherein said reference signal includes a ramp signal.

8. A method for sensing a light signal received by at least one light sensor of an array of light sensors, the method comprising the steps of:

converting said light signal into a first electrical signal having a measure including a mantissa part and an exponent part; and for each light sensor of said array, measuring said mantissa part and said exponent part.

9. The method of claim 8 further including, before said measuring step, providing first and second measuring devices configured to retain a measure of said mantissa and said exponent respectively.

10. The method of claim 8 wherein said measuring step includes sampling said first and second measuring devices according to a sampling signal.

11. The method of claim 10 wherein said sampling signal pulses at discrete exponentially increasing intervals of times.

12. A light sensing device comprising:

at least one light sensor configured to be exposed to a light image that has an intensity represented by a floating point number including a mantissa part and an exponent part;

a first measuring device coupled to said at least one light sensor;

a second measuring device;

a sampling generator configured to generate a sampling signal to said first and second measuring devices, said sampling signal inhibited when said measure of said mantissa is lesser than or equal to a predetermined value; and wherein upon inhibition of said sampling signal, said first and second measuring devices configured to retain a measure of said mantissa and exponent respectively.

13. The light sensing device of claim 12 further including a comparator circuit coupled to said at least one light sensor and to said first measuring device, said comparator configured to inhibit said sampling signal when said mantissa is lesser than or equal to a predetermined value.

14. The light sensing device of claim 13 wherein said comparator circuit is coupled to a reference signal that prevents said comparator circuit from inhibiting said sampling signal when said sampling signal is active.

15. The light sensing device of claim 14 wherein said sampling signal pulses at discrete exponentially increasing intervals of time.

16. The light sensing device of claim 15 wherein said reference signal includes a ramp signal.

17. The light sensing device of claim 13 wherein said comparator circuit is coupled to a predetermined number of adjacent pixels.

* * * * *